Patented Apr. 19, 1932

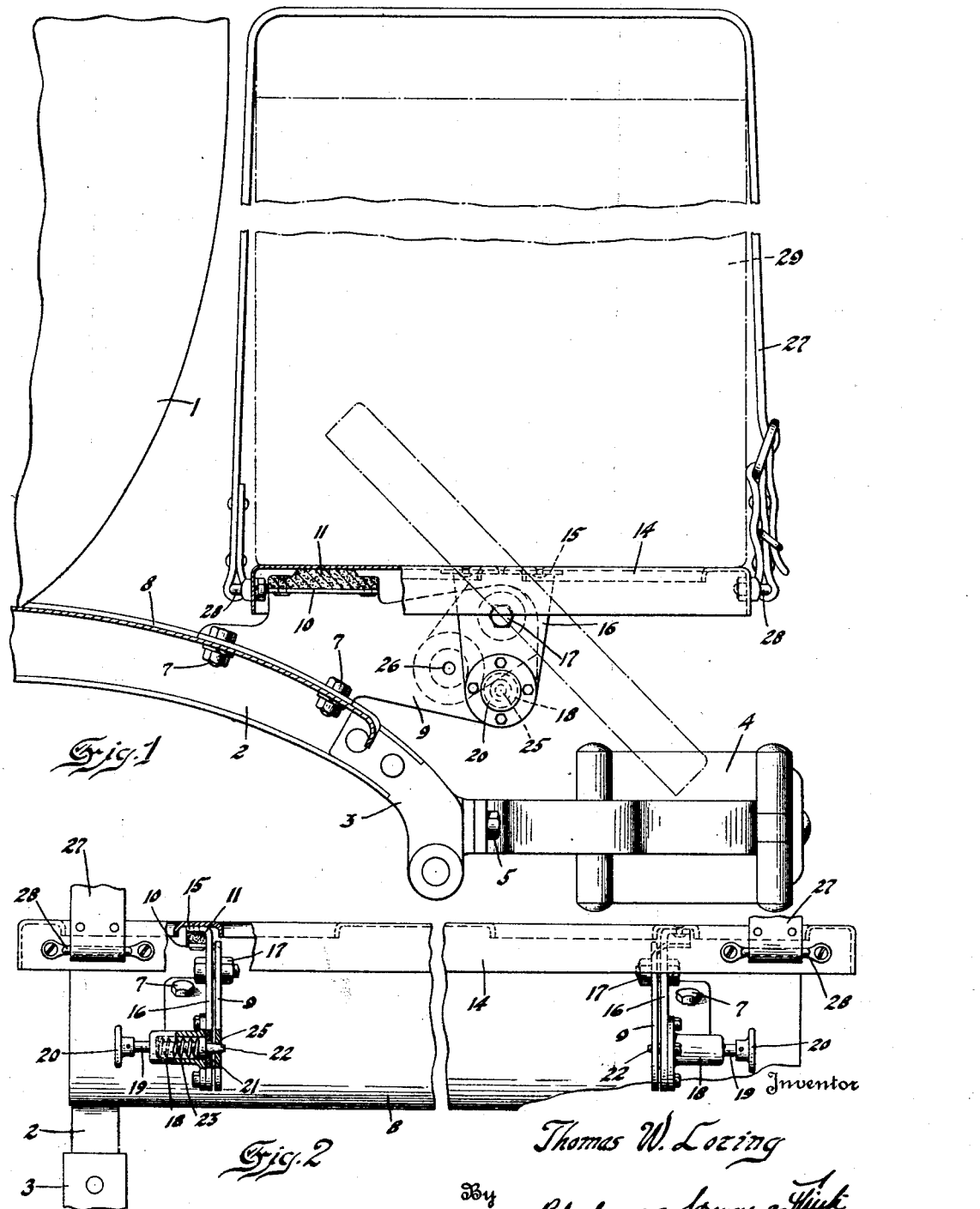

1,854,946

UNITED STATES PATENT OFFICE

THOMAS W. LORING, OF LANSING, MICHIGAN, ASSIGNOR TO GENERAL MOTORS CORPORATION, OF DETROIT, MICHIGAN, A CORPORATION OF DELAWARE

TRUNK RACK

Application filed November 15, 1928. Serial No. 319,597.

This invention relates to motor vehicles and particularly to an improvement in luggage or trunk racks for attachment on the rear end of a vehicle.

It is an object of the invention to provide a ruggedly constructed trunk rack made of a few simple parts which will promote economy in manufacture and ease of assembly, and which may be readily applied as an accessory either on existing vehicles or as standard equipment on new cars.

A further object of the invention is to provide an adjustable load carrying platform having positive locking means to hold the platform in adjusted positions, and which when not in use may be tilted to a position behind the impact member of the fender guard or bumper so as to be protected from injury in the event of a collision or the like, and to furthermore avoid the rough and unfinished appearance of an unused rigidly mounted trunk rack and afford a structure that fits in better with the pleasing lines of the vehicle and so enhance its appearance and lend a sporty effect to the rear end.

Another object of the invention is to provide a buffer for contact with the platform when the platform is in load carrying position, which will serve to cushion shocks and jars and eliminate noise and rattles.

Other objects will be apparent from the accompanying drawings illustrating a preferred but not necessarily the only embodiment of the invention and wherein Fig. 1 is a side elevation of a rear portion of a motor vehicle, partly in section, illustrating the aplication of the invention, and Fig. 2 is a fragmentary rear elevation partly in section.

In the drawings the reference character 1 indicates an automobile body supported in the usual manner upon a chassis frame 2, having secured in the down turned rear ends thereof the conventional bracket 3 for mounting the spring shackles, and which may also carry the fender guard or bumper 4 secured thereto as by the bolt 5. Fastened as by bolts 7 to a cover plate 8 extending transversely between the longitudinal chassis frame members, are a pair of mounting brackets 9, which for economy and convenience in manufacture, are preferably stamped from sheet metal. At the forward upper edges of the brackets 9, a flange 10 is bent over on which is riveted or otherwise secured, the buffer element 11, preferably consisting of elastic deformable material, such as rubber, and which is adapted to contact and cushion the under side of the load carrying platform 14. The platform 14 may be stamped from sheet metal and provided with a series of openings having marginal down turned flanges, which make for rigidity in construction and improve the appearance of the platfrom as a whole.

Secured as by riveting, welding, or the like to the under side of the platform 14 is the angular flange 15 of a dependent plate or bracket 16, pivotally connected by a bolt 17 with the rearward portion of the bracket 9, forming thereby a pivotal mounting for the load carrying platform 14. At the lower end of the attachment plate member 16 is secured a cage or casing 18 through which extends a reciprocable plunger or stem 19 having a hand knob or button 20 at one end and outside the casing, and an enlarged shouldered portion 21 within the casing 18 and adjacent the terminal tip 22 at the opposite end of the stem. A coil spring 23 within the casing 18 bears against the shoulder 21 and exerts its tension to push the plunger inwardly and force the tip 22 through aligned openings in the plate 16 and bracket 9. Any desired number of such openings may be provided in the bracket 9, but in the present case only two are shown, one being indicated by the reference character 25 and the other by the numeral 26, so that there are just two positions of adjustment for the load carrying platform. When the platform is in its load carrying position as indicated in the drawings, the tip 22 will extend through the opening 25 to hold the platform in a substantially horizontal position at which time a number of straps such as shown at 27 secured by brackets 28 to the platform may be used to hold in place luggage, for example, a trunk as indicated at 29. At times when the platform is not being used for supporting luggage it may be tilted about the pivotal axis provided by the studs 17 to the inclined position indicated by dotted lines in Fig. 1 so that its rearmost portion is located below the top and in front of the bumper bars, 4.

To accomplish the adjustment of the platform, the knob 20 on each plunger 19 on opposite sides of the vehicle is pulled outward to retract the tip 22 from the opening or recess in the bracket 9 and the platform may then be moved to its desired position of adjustment, and when the tip portion 22 comes into line with the other opening in the bracket 9, the tension of the spring 23 will force it into the opening whereby the platform is securely held in the desired position.

I claim:

1. A luggage rack for use on motor vehicles including a pair of rearwardly extending brackets, a non-collapsible platform overlying the brackets, a pivotal connection between each bracket at the rear thereof and a dependent portion on the platform intermediate the front and rear margins of the load supporting area of the platform, about which the platform may be tilted from a substantially horizontal load carrying position to a downwardly and rearwardly inclinded inoperative position, and a shelf at an intermediate portion of a bracket engageable with the front part of the platform when the platform is in a load carrying position.

2. A luggage rack for use on motor vehicles including a pair of rearwardly extending brackets, a non-collapsible platform overlying the brackets, a pivotal connection between each bracket at the rear thereof and a dependent portion on the platform intermediate the front and rear margins of the load supporting area of the platform, about which the platform may be tilted from a substantially horizontal load carrying position to a downwardly and rearwardly inclined inoperative position, a shelf like portion at an intermediate portion of the bracket and a cushion element on the shelf engageable with the front part of the platform when the platform is in load carrying position.

In testimony whereof I affix my signature.

THOMAS W. LORING.